United States Patent [19]
Sakamoto

[11] Patent Number: 5,216,915
[45] Date of Patent: Jun. 8, 1993

[54] MISFIRE DIAGNOSIS APPARATUS FOR AN INTERNAL COMBUSTION ENGINE

[75] Inventor: Masanori Sakamoto, Hamura, Japan

[73] Assignee: Fuji Jukogyo Kabushiki Kaisha, Tokyo, Japan

[21] Appl. No.: 699,674

[22] Filed: May 14, 1991

[30] Foreign Application Priority Data

May 31, 1990 [JP] Japan ................................. 2-144917

[51] Int. Cl.⁵ .......................................... G01M 15/00
[52] U.S. Cl. ................................................... 73/117.3
[58] Field of Search .................... 73/116, 117.3, 117.2, 73/35; 364/431.08

[56] References Cited

U.S. PATENT DOCUMENTS

| | | | |
|---|---|---|---|
| 4,291,383 | 9/1981 | Tedeschi et al. | 73/117.2 |
| 4,338,813 | 7/1982 | Hunninghaus et al. | 73/116 |
| 4,422,421 | 12/1983 | Ezoe | 123/424 |
| 4,558,591 | 12/1985 | Francis et al. | 73/116 |
| 4,630,583 | 12/1986 | Suzuki et al. | 123/421 |
| 4,932,379 | 6/1990 | Tang et al. | 73/117.3 |
| 4,966,115 | 10/1990 | Ito et al. | 123/335 |
| 5,035,220 | 7/1991 | Uchinami et al. | 123/481 |

Primary Examiner—Robert Raevis
Attorney, Agent, or Firm—Beveridge, DeGrandi, Weilacher & Young

[57] ABSTRACT

A misfire diagnosis apparatus for an internal combustion engine is shown including initial acceleration judging unit, delay unit, and a misfire judging unit. The initial acceleration judging unit operates to judge the initial state of a starting acceleration or a gear shift acceleration on the basis of the detected result of acceleration detecting unit. Subsequently, the delay unit operates to stop a misfire judgement for a predetermined time period when the initial acceleration is judged. The misfire judging unit operates to start the misfire judgement operation after a lapse of a predetermined delay time period. Since the misfire judgement is stopped during the initial acceleration, erroneous diagnoses of misfirings are avoided.

9 Claims, 12 Drawing Sheets

MISFIRE DIAGNOSIS APPARATUS FOR AN INTERNAL COMBUSTION ENGINE

BACKGROUND OF THE INVENTION

The present, invention relates to a misfire diagnosis apparatus for an internal combustion engine, particularly to a stopping system of the misfire diagnosis apparatus when a motor vehicle is in an accelerating condition.

In general, stable power output is desirable at any stroke for a multi-cylinder engine. However, combustion in each cylinder is liable to vary by the following reasons:

(1) Intake air to each cylinder is not uniformly distributed because of complicated configurations of intake pipes and interference of induced air.

(2) A difference of temperature between cylinders caused by a different route of a cooling system.

(3) A slight volumetric difference due to manufacturing allowance between each cylinder and piston.

(4) Slight discrepancy of air fuel ratio for each cylinder caused by unequal fuel injection quantity according to the manufacturing errors of injectors, etc.

Heretofore, the so-called combustion fluctuation has been suppressed to the minimum by the air fuel ratio controls and ignition timing controls of the individual cylinders. In a recent high-performance engine tending toward a higher output and a lower fuel cost, however, when any of the injectors, ignition plugs etc. has degraded or broken down, intermittent misfiring arises and incurs lowering in the output.

Even when the intermittent misfiring has occurred in one cylinder in the multicylinder engine, a driver often drives an automobile without noticing the misfiring. Besides, it is difficult to diagnose during driving the cause of the misfiring is temporary or is the degradation or the like of any of the injectors, the ignition plugs etc.

Therefore, according to the official gazette of Japanese Patent Application Laid-open No. 258955/1986 by way of example, a comparison is made between the difference of the minimum value and maximum value of the r. p. m. of an engine corresponding to a cylinder at the previous combustion stroke and the difference of the minimum value and maximum value of the engine r. p. m. corresponding to the cylinder at the present combustion stroke. The combustion condition of the pertinent cylinder is discriminated, depending upon whether or not the discrepancy between the compared values falls within a preset reference value. In a case where abnormal combustion has occurred in excess of a predetermined number of times, a misfiring is judged, and warning is given.

Meanwhile, when a throttle valve is abruptly opened at, e.g., a starting acceleration, the quantity of intake air to be fed into each cylinder increases, and a temporary misfiring is liable to occur.

With the prior-art technique mentioned above, the misfiring is diagnosed even in the regions of the starting acceleration, etc., so that the diagnosis is liable to become erroneous and poses a problem in reliability.

SUMMARY OF THE INVENTION

The present invention has been made in view of the above circumstances, and has for its object to provide a misfire diagnosis apparatus for an engine which can reduce misjudgements and attain a high reliability.

In order to accomplish the object, a misfire diagnosis apparatus for an engine according to the present invention comprises, as shown in FIG. 1, initial acceleration judging means M1 for judging an initial acceleration on the basis of a detected result of acceleration detecting means; delay means M2 for stopping a misfire judgement for a predetermined time period in a case where the initial acceleration has been judged; and misfire judging means M3 for starting the misfire judgement of each cylinder after lapse of the predetermined delay time period.

More concretely, the present invention provides a misfire diagnosis apparatus for an internal combustion engine (1) with a crankshaft (1b) for outputting power and a camshaft (1c) for actuating valves having, a crank plate (15) connected to said crankshaft (1b) for indicating a crank angle, a crank angle sensor (16) for detecting said crank angle of said crankshaft (1b) and for generating a crank angle signal, a cam plate (17) connected to said camshaft (1c) for indicating a cam position, a cam angle sensor (18) for detecting said cam position of said camshaft (1c) and for producing a cam angle signal, a clutch switch (19a) for detecting a clutch position and for producing a clutch signal, a neutral switch (19b) for detecting a neutral position of a transmission and for generating a neutral position signal, and control means (21) responsive to said crank angle and said cam angle for controlling an ignition timing of said engine (1), comprising:

a plurality of even numbers of projections (15a–15c) provided on a periphery of said crank plate (15) for indicating said crank angle, said projections (15a–15c) being diametrically symmetrically arranged on said periphery and each pair of said projections (15a–15c) being spaced apart by at least three different specific angles ($\theta 1$, $\theta 2$, $\theta 3$);

a plurality of cam projections (17a–17c) provided on a periphery of said cam plate (17) and spaced angularly apart at a predetermined angle on said periphery for indicating said cam position;

initial acceleration judging means (M1) responsive to said clutch signal and said neutral position signal for judging an accelerating condition of said engine (1) and for producing an acceleration signal;

delay means (M2) responsive to said acceleration signal for delaying an output of said acceleration signal for a predetermined period;

discriminating means (S202) responsive to said crank angle signal and said cam angle signal for discriminating a cylinder number at a combustion stroke and for producing a cylinder number signal (#i);

misfire judgement means (M3) responsive to said acceleration signal, said cylinder number signal (#i), the crank angle signal and the cam angle signal for calculating a differentiated engine speed and for deciding a misfire of the cylinder number at the combustion stroke in order to generate a misfire signal, and warning means (30,31) responsive to the misfire signal for storing a number of the misfire corresponding to the cylinder number and for indicating a malfunction of the internal combustion engine (1).

With the above structure, initial acceleration judging means decides an initial acceleration on the basis of a detected result from the acceleration detecting means, and delay means stops the misfire judgement for a predetermined time period. Then, misfire judgement means starts the misfire judgement for each cylinder.

DESCRIPTION OF THE PREFERRED EMBODIMENTS

Now, embodiments of the present invention will be described with reference to the drawings.

FIGS. 2-9 illustrate the first embodiment of the present invention.

Figure 1:
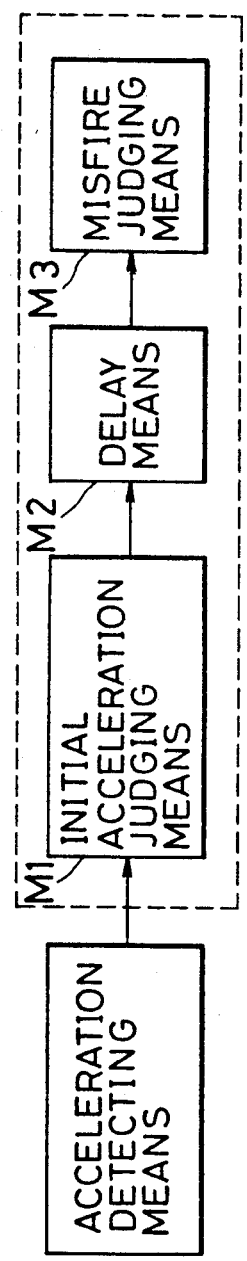
FIG. 1 is a block diagram of a misfire diagnosis apparatus according to the present invention.
Figure 2:
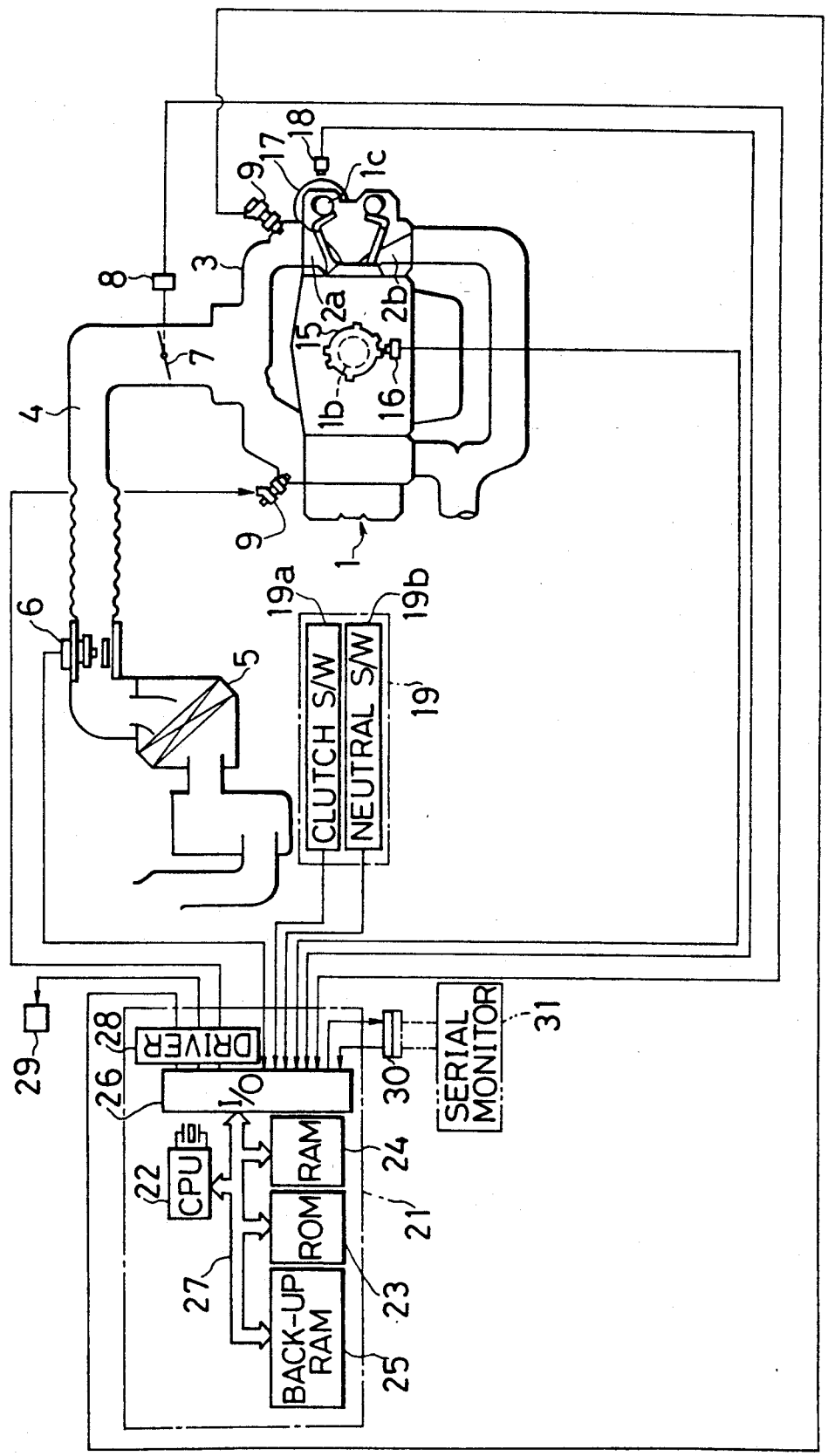
FIG. 2 is a schematic diagram of an engine control system.

Numeral 1 in FIG. 2 indicates an engine proper, and a four-cylinder horizontally-opposed engine is shown in the figure.

An intake pipe 4 communicates with the intake port 2a of the engine proper 1 through an intake manifold 3, and an intake air quantity sensor 6 is incorporated in the part of the intake pipe 4 immediately downstream of an air cleaner 5. In addition, an idling switch 8 which turns ON under a fully-closed throttle condition is joined to a throttle valve 7 which is incorporated midway of the intake pipe 4. Further, (multipoint) injectors 9 whose injection ports are directed toward the intake port 2a are disposed downstream of the intake manifold 3.

In addition, a crank rotor or crank plate 15 is secured on the crankshaft 1b of the engine proper 1, and a crank angle sensor 16 which includes an electromagnetic pickup or the like for detecting a crank angle is mounted in opposition to the outer periphery of the crank rotor 15. Further, a cam rotor or cam plate 17 is secured on a camshaft 1c which revolves at a rate of ½ relative to the crankshaft 1b, and a cam angle sensor 18 for detecting a cam angle is mounted in opposition to the outer periphery of the cam rotor 17.

Figure 3:
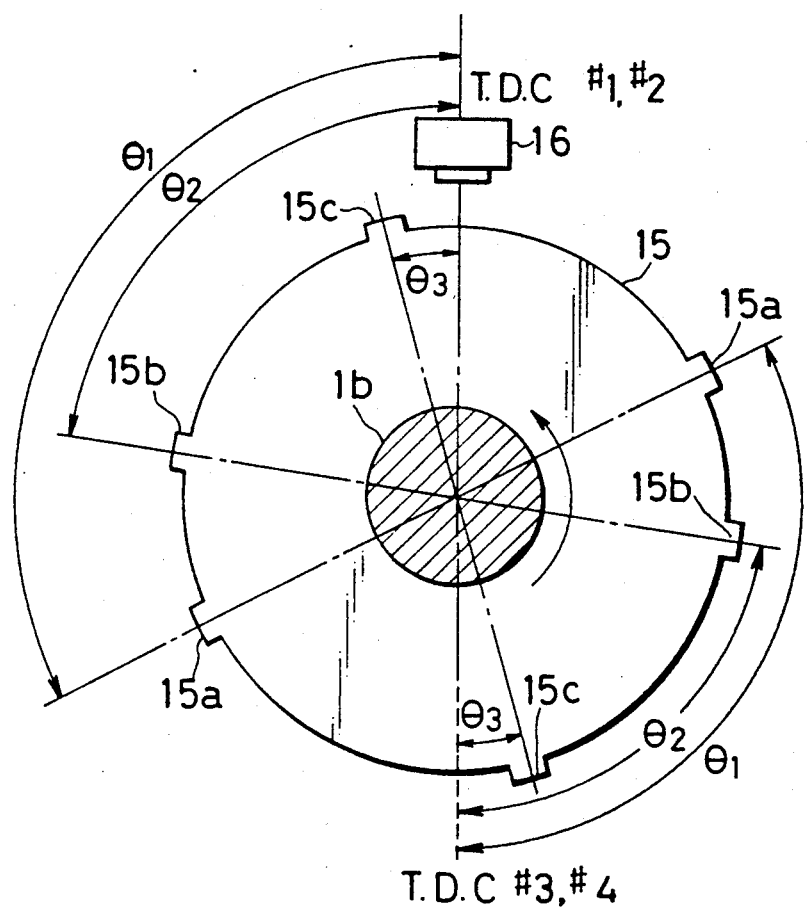
FIG. 3 is a front view of a crank plate and a crank angle sensor.

As shown in FIG. 3, the outer periphery of the crank rotor 15 is formed with projections 15a, 15b and 15c. The respective projections 15a, 15b and 15c are formed at positions $\theta 1$, $\theta 2$ and $\theta 3$ before the top dead center (BTDC) of compression in each cylinder, and an engine speed N is calculated from a time period in which the section between the projections 15b and 15c passes.

Meanwhile, in general, the crank angle which exhibits the maximum combustion pressure in the MBT (most best torque) control is substantially constant in the entire operating region, and the combustion pressure does not abruptly rise before about 10° in terms of the BTDC crank angle yet.

Figure 5:
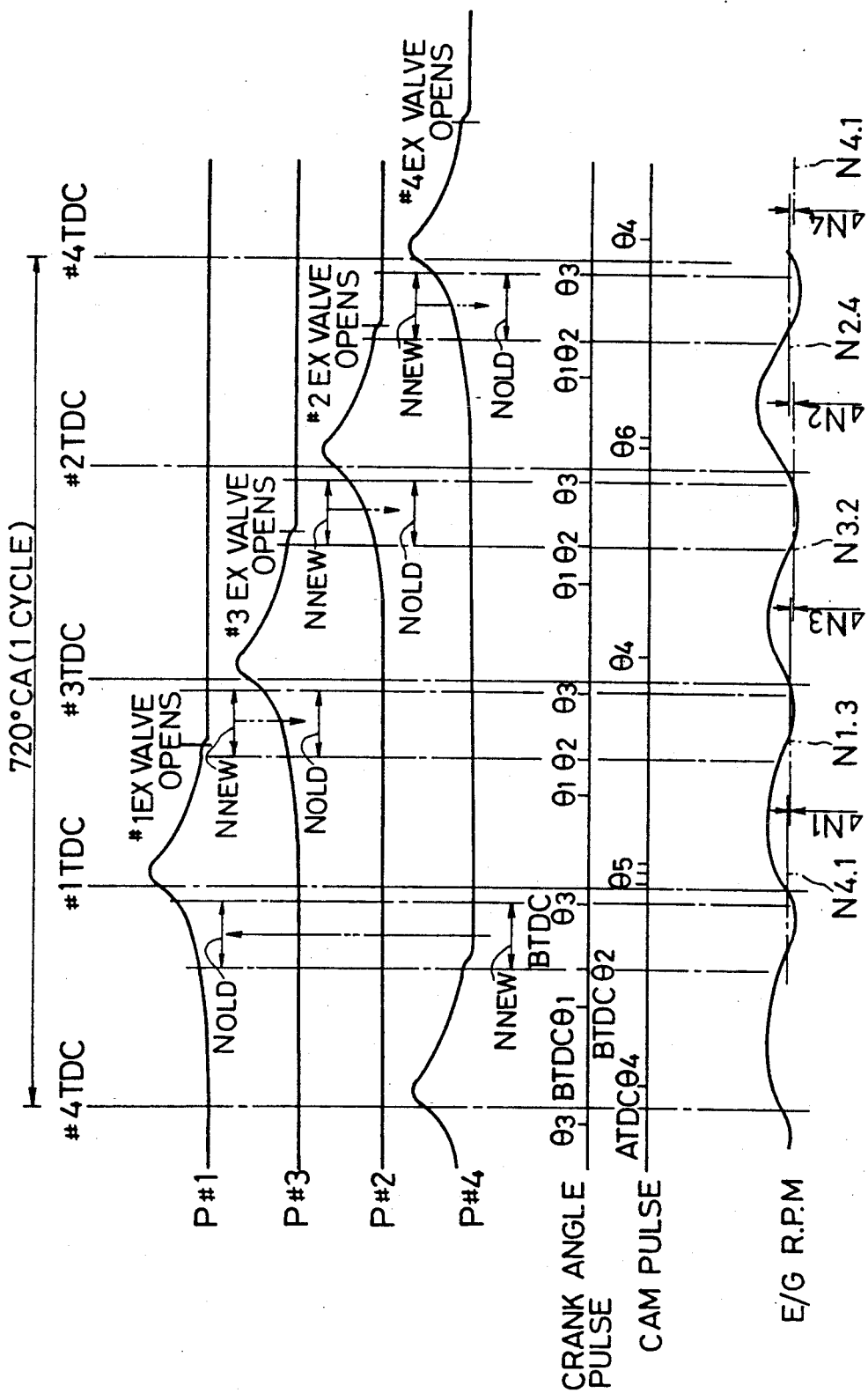
FIG. 5 is a time chart of pressure fluctuations in cylinders, crank pulses, cam pulses and engine r. p. m.

Moreover, as shown in FIG. 5, in the embodiment, the valve opening timing of the exhaust valve of each cylinder is set at the side of a somewhat retarded angle with respect to the ignition reference crank angle BTDC $\theta 2$ of the next combustion cylinder. Since, however, the combustion pressure usually lowers abruptly immediately after the opening of the exhaust valve, it exerts almost no influence at the crank angle BTDC $\theta 3$.

Accordingly, when the crank angle $\theta 3$ of the projection 15c is set at an advanced angle side with respect to the BTDC CA of 10°, the section between the crank angles BTDC $\theta 2$ and $\theta 3$ of the respective projections 15b and 15c is hardly influenced by the combustion between the cylinders. That is, a work based on the combustion between the cylinder at a combustion stroke and the cylinder at the next combustion stroke is not done in the section.

Figure 4:
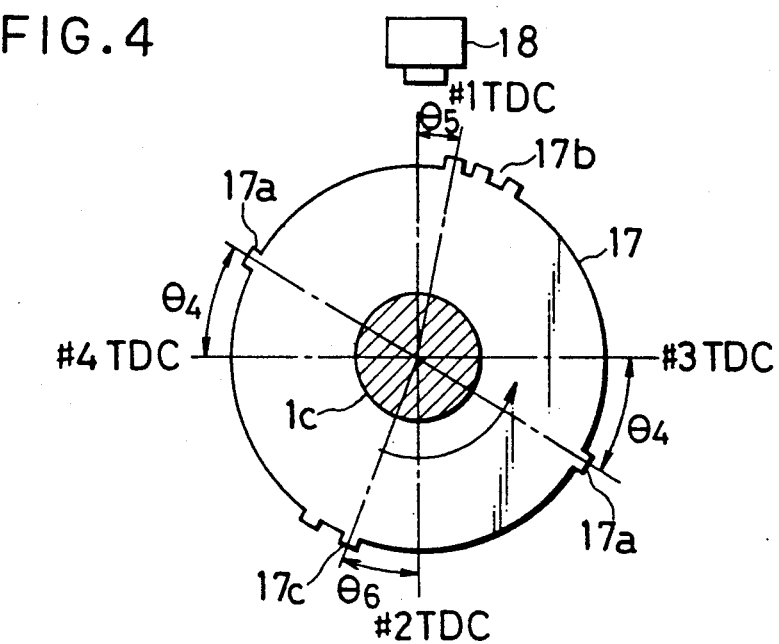
FIG. 4 is a front view of a cam plate and a cam angle sensor.

Also, as shown in FIG. 4, the outer periphery of the cam rotor 17 is formed with projections 17a, 17b and 17c for discriminating the cylinders. The projections 17a are respectively formed at the positions $\theta 4$ after the top dead centers (ATDC) of compression, of the cylinders #3 and #4. In addition, the projection group 17b is configured of three projections, the first one of which is formed at the position $\theta 5$ after the top dead center (ATDC) of compression, of the cylinder #1. Further, the projection group 17c is configured of two projections, the first one of which is formed at the position $\theta 6$ after the top dead center (ATDC) of compression, of the cylinder #2.

In the illustrated embodiment, there are held $\theta 1 = 97°$ CA, $\theta 2 = 65°$ CA, $\theta 3 = 10°$ CA, $\theta 4 = 20°$ CA, $\theta 5 = 5°$ CA, $\theta 6 = 20°$ CA and $\theta(2-3) = 55°$ CA. Owing to this arrayal, as indicated in FIG. 5, in a case where the cam angle sensor 18 has detected cam pulses at the angle $\theta 5$ (the projections 17b) by way of example, it can be discriminated that a crank pulse to be subsequently detected by the crank angle sensor 16 is a signal which indicates the crank angle of the cylinder #3.

Also, in a case where a cam pulse at the angle $\theta 4$ (the projection 17a) has been detected after the cam pulses of the angle $\theta 5$, it can be discriminated that the subsequent crank pulse to be detected by the crank angle sensor 16 indicates the crank angle of the cylinder #2. Similarly, it can be discriminated that a crank pulse after the detection of cam pulses at the angle $\theta 6$ (the projections 17c) indicates the crank angle of the cylinder #4. In addition, in a case where a cam pulse at the angle $\theta 4$ (the projection 17a) has been detected after the cam pulses of the angle $\theta 6$, it can be discriminated that a crank pulse to be subsequently detected indicates the crank angle of the cylinder #1.

Further, it can be discriminated that the crank pulse which is detected by the crank angle sensor 16 after the detection of the cam pulse(s) by the cam angle sensor 18 indicates the reference crank angle ($\theta 1$) of the corresponding cylinder.

The numeral 21 designates an electronic control unit which is configured of a microcomputer etc. A CPU (central processing unit) 22, a ROM 23, a RAM 24, a back-up RAM 25 and an I/O interface 26, which constitute the electronic control unit 21, are interconnected through bus lines 27. The sensors 6, 16 and 18, the idling switch 8, and run state discriminating means 19, configured of a clutch switch 19a which is turned ON by the clutch engagement of a manual transmission (the release of a clutch pedal) and a neutral switch 19b which is turned ON under the neutral state of a shift position, are connected to the input ports of the I/O interface 26. In addition, the injectors 9 and warning means, such as an indicator lamp, 29 disposed on an instrument panel or the like not shown are connected to the output ports of the I/O interface 26 through a driver circuit 28.

A control program, fixed data, etc. are stored in the ROM 23. The fixed data includes a misfire judgement level map MPΔN$_{LEVEL}$ to be described later.

In addition, the output signals of the sensors subjected to data processing and data arithmetically processed by the CPU 22 are stored in the RAM 24, and trouble data items such as the misfire judgement data of each cylinder are stored in the back-up RAM 25.

Further, a trouble diagnosing connector 30 is connected to the output port of the I/O interface 26. The trouble data stored in the back-up RAM 25 can be read out by connecting a trouble diagnosing serial monitor 31 to the trouble diagnosing connector 30.

Incidentally, the misfire diagnosing function of the electronic control unit 21 includes initial acceleration judging means for judging an initial acceleration on the basis of a detected result of acceleration detecting means; delay means for stopping a misfire judgement for a predetermined time period in a case where the initial acceleration has been judged; and misfire judging means for starting the misfire judgement of each cylinder after lapse of the predetermined delay time period.

Next, misfire diagnosis steps in the electronic control unit 21 will be described in conjunction with the flow charts of FIGS. 8 and 9.

Misfire Diagnosis Stopping Steps

Figure 8:
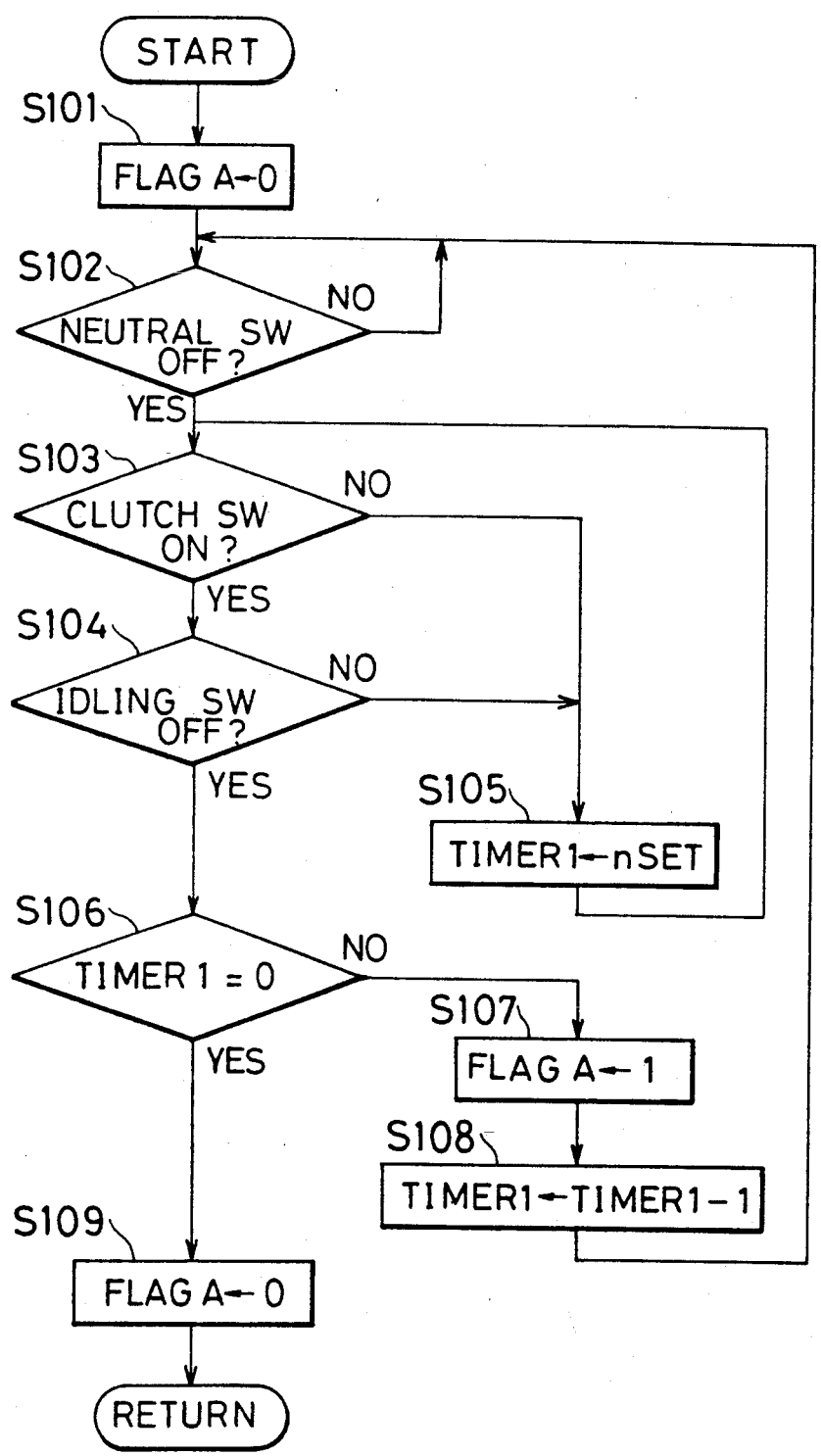
FIG. 8 is a flow chart showing misfire diagnosis stopping steps.

As shown in FIG. 8, a misfire diagnosis stop is cleared so as to initialize a misfire diagnosis stop flag FLAG$_A$ at a step (hereinbelow, abbreviated to "S") 101 (FLAG$_A$←0, resetting the misfire diagnosis stop). At an S102 et seq., the initial state of a starting acceleration or a gear shift acceleration in course of running is judged so as to stop a misfire diagnosis for a predetermined time period in the case of the initial acceleration.

As indicated in the flow chart of the figure, the initial acceleration state is judged from the ON/OFF states of the neutral switch 19b, clutch switch 19a and idling switch 8. The reason is that, generally in a manual transmission car, the starting acceleration or the gear shift acceleration will necessitate a gear shift operation, followed by the operation of engaging a clutch and then treading a throttle valve somewhat deeply.

Accordingly, the S102 discriminates if the neutral switch 19b is ON (neutral shift position). In a case where the neutral switch 19b is ON, the S102 is repeated, and in a case where it is OFF, the control flow proceeds to an S103 upon judging that the gear shift operation has been completed or is immediately before its completion.

The S103 judges if the clutch switch 19a is ON (clutch engaged). In a case where the clutch switch 19a is OFF (clutch disengaged), the starting acceleration or the gear shift acceleration may possibly succeed. Therefore, the control flow proceeds to an S105 at which a delay timer TIMER1 is set at a set value nSET (corresponding to, for example, 2 sec.) (TIMER1←nSET), and it returns to the S103. On the other hand, in a case where the clutch switch 19a is ON (clutch engaged), both an accelerating operation and a decelerating operation are considered to succeed. At an S104, therefore, if the idling switch 8 is ON (throttle fully closed) is judged. In a case where the idling switch 8 is ON, the accelerator pedal may possibly be subsequently trod for the accelerating operation. Therefore, the control flow proceeds to the S105 at which the delay timer TIMER1 is set (TIMER1←nSET), and it returns to the S103.

On the other hand, in a case where the idling switch 8 is OFF, the control flow proceeds to an S106, which judges if the delay timer TIMER1 has become zero. In case of TIMER1≠0, the automobile is immediately after the shift to the starting acceleration or the gear shift acceleration or is still in the initial state of this acceleration. Therefore, the misfire diagnosis stop flag FLAG$_A$ is set at an S107 (FLAG$_A$←1, stopping the misfire diagnosis), and the content of the delay timer TIMER1 is counted down at an S108 (TIMER1←TIMER1−1), whereupon the control flow returns to the S102.

In addition, in a case where TIMER1=0 holds at the S106, it is judged that a predetermined time period has lapsed since the beginning of the starting acceleration or the gear shift acceleration or that the automobile is in a usual run state. Thus, the control flow proceeds to an S109 at which the misfire diagnosis stop flag FLAG$_A$ is cleared (FLAG$_A$←0), whereupon the routine is left.

As a result, the misfire diagnosis in the starting acceleration or gear shift acceleration, during which the misfire is liable to occur temporarily due to the increased quantity of intake air and the resulting lean mixture, is stopped for the predetermined time period since the initial acceleration. Therefore, an erroneous diagnosis ascribable to the temporary misfire can be effectively prevented, the diagnostic accuracy can be enhanced, and a high reliability can be attained.

Misfire Diagnosing Steps

The misfire diagnosis is interruptingly executed for each cylinder in synchronism with the r. p. m. of the engine.

Figure 9A:
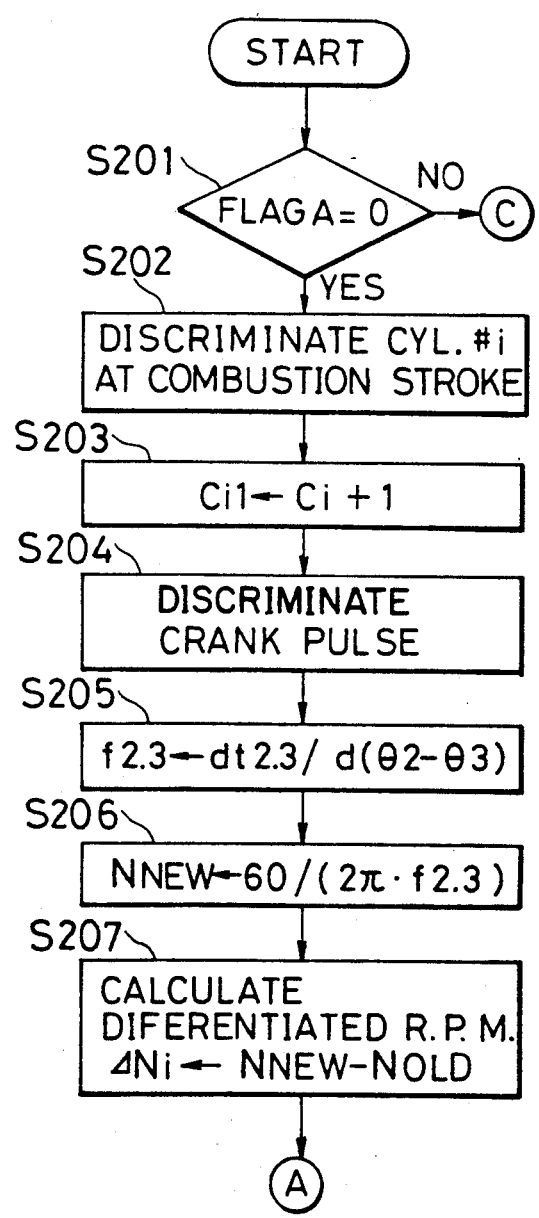
FIGS. 9a-9c is a flow chart showing misfire judgement steps.
Figure 9B:
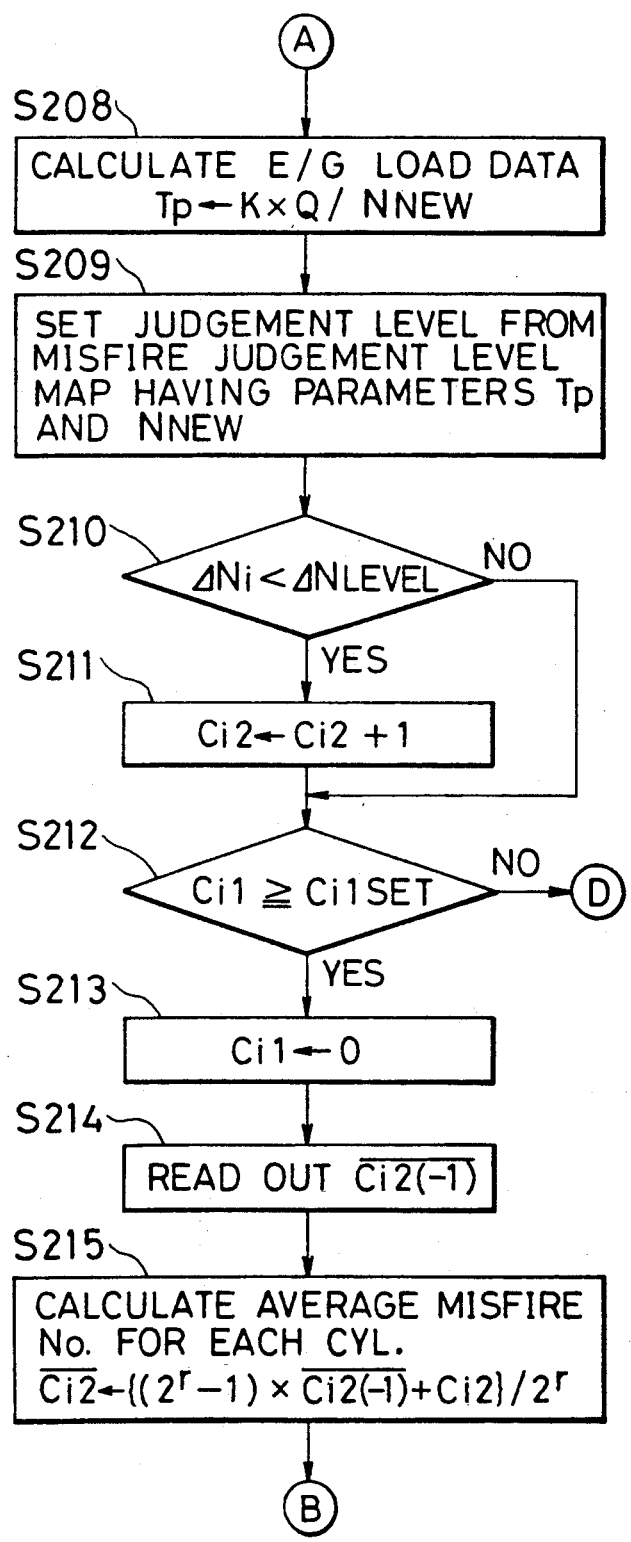
Figure 9C:
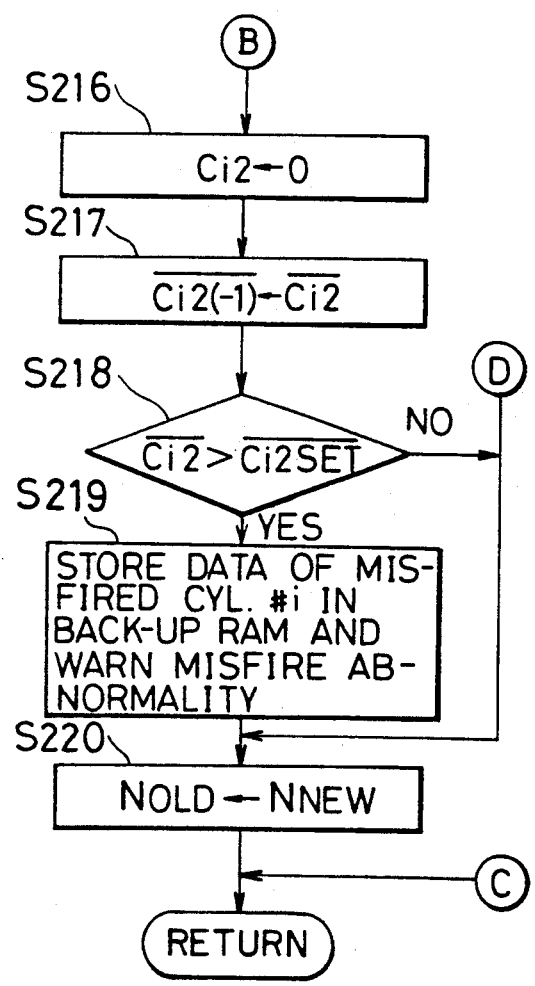

As shown in FIG. 9, first of all, an S201 decides if the misfire diagnosis stop flag FLAG$_A$ of the misfire diagnosis stopping program is in its reset status (FLAG$_A$=0, resetting the misfire diagnosis stop). In case of FLAG$_A$=1 (stopping the misfire diagnosis), it is judged that the engine is in the initial state of the starting acceleration or gear shift acceleration, and the routine is left without making the misfire diagnosis.

On the other hand, in case of FLAG$_A$=0 (resetting the misfire diagnosis stop), in order to make the misfire diagnosis, an S202 discriminates the cylinder #i (i=1, 3, 2, 4) at a combustion stroke on the basis of the crank pulse and cam pulse(s) which are respectively delivered from the crank angle sensor 16 and cam angle sensor 18, and an S203 counts up the calculative cycle number Ci1 of the pertinent cylinder #i at the combustion stroke (Ci1←Ci1+1). cylinder Subsequently, at an S204, the crank pulses for detecting the angles BTDC θ2 and θ3 as delivered from the crank angle sensor 16 are discriminated on the basis of the interrupt of the cam pulses, and at an S205, a period f2,3 is calculated from the elapsed time interval t2,3 between the crank pulses for detecting the angles BTDC θ2 and θ3, and the angular difference (θ2 − θ3) between the angles θ2 and θ3 (f2,3 dt2,3/d(θ2−θ3)).

Thereafter, at an S206, the present engine r. p. m. value N$_{NEW}$ is calculated from the period f2,3 (N$_{NEW}$←60/(2π·f2,3)), and at an S207, the differentiated r. p. m. value ΔNi (i=1, 3, 2, 4) of the section (θ2−θ3) in which no work is done by the combustion of the cylinder #i at the combustion stroke is calculated from the difference between the present engine r. p. m. N$_{NEW}$ and engine r. p. m. $N_{OLD}$ evaluated in the last routine ($\Delta Ni \leftarrow N_{NEW} - N_{OLD}$).

As shown in FIG. 5, in the case of the four-cycle four-cylinder engine, the calculation of the engine r. p. m. $N_{NEW}$ in the section in which no work is done by the combustion is executed every 180° CA. Therefore, when note is taken of the cylinder #1 by way of example, the differentiated r. p. m. $\Delta N1$ of the cylinder #1 can be obtained by subtracting the engine r. p. m. $N_{OLD}$ calculated at the last time, from the engine r. p. m. $N_{NEW}$ calculated at the present time. On the other hand, when the cylinder #3 is noticed, the engine r. p. m. $N_{NEW}$ of the cylinder #1 is set as the value $N_{OLD}$, whereupon the differentiated r. p. m. $\Delta N3$ can be obtained from the subsequent engine r. p. m. $N_{NEW}$ of the cylinder #3.

Letting N4.1, N1.3, N3.2 and N2.4 denote the engine r. p. m. values common to each other between the cylinders, respectively, the differentiated r. p. m. values of the individual cylinders are as follows:

$\Delta Ni = N_{NEW} - N_{OLD}$ $\Delta N1 = N1.3\ N4.1$ $\Delta N3 = N3.2\ N1.3$ $\Delta N2 = N2.4\ N3.2$ $\Delta N4 = N4.1\ N2.4$ Meanwhile, it has been experimentally revealed that the differentiated r. p. m. values $\Delta Ni$ are intensely correlated with illustrated average effective pressures Pi, namely, the combustion conditions of the cylinders. Accordingly, whether the combustion condition of each cylinder #i (the illustrated average effective pressure) is good or bad can be conjectured by evaluating the differentiated r. p. m. $\Delta Ni$.

The relationships between the differentiated r. p. m. $\Delta Ni$ and the illustrated average effective pressure will be explained below.

First, the state in which the engine is rotating is expressed by the following equation:

$$I \cdot \frac{2\pi}{60} \cdot \frac{dN}{dt} = Ti - Tf \quad (1)$$

I: moment of inertia,
N: engine r. p. m.,
Ti: instructed torque,
Tf: friction torque.
Eq (1) is simplified into:

$$\frac{dN}{dt} \propto Ti - Tf \quad (2)$$

Further, in terms of pressures, this equation is expressed by:

$$\frac{dN}{dt} \propto Pi - Pf \quad (3)$$

Pi: illustrated average effective pressure,
Pf: frictional-loss effective pressure.

Experimentally, as to the four-cycle four-cylinder engine, the crank angle widths $\theta 2.3$ for detecting the r. p. m. were set to be before and after the combustion stroke, and the value dN/dt of Eq. (3) was found on the basis of the differentiated r. p. m. $\Delta Ni$ and a temporal change $\Delta T$ (180° CA) taken meantime. As a result, a very intense correlation was exhibited.

In this case, when it is considered that the fluctuation of the change AT (180° CA) is a negligible amount and that the frictional-loss effective pressure Pf is also constant, the following holds in view of Eq. (3):

$$\Delta N = K \times Pi + PF \quad (4)$$

Pi, PF: constants.

Accordingly, the illustrated average effective pressures Pi, namely, the combustion conditions can be conjectured for the individual cylinders by evaluating the differentiated r. p. m. values $\Delta Ni$ of the respective cylinders.

Then, when the differentiated r. p. m. values $\Delta Ni$ of the respective cylinders #i are individually brought close to "0", the combustion conditions of all the cylinders can be rendered uniform.

On the other hand, when in Eq. (3), the frictional average effective pressure Pf is regarded as being constant and is denoted by a constant C, and a proportionality constant is denoted by K, the following holds:

$$\frac{dN}{dt} = K \cdot Pi - C \quad (5)$$

Accordingly, the illustrated average effective pressure Pi can be calculated by evaluating the constants K and C beforehand.

According to Eq. (5), the differentiated r. p. m. value $\Delta Ni$ is differentiated with respect to time, whereby the illustrated average effective pressure Pi can be more accurately conjectured from the differentiated r. p. m. $\Delta N$.

The engine r. p. m. value $N_{NEW}$ calculated in the section ($\theta 2 - \theta 3$) in which no work based on the combustion is done does not contain any fluctuating factor of the r. p. m. attributed to the combustion pressure, and it is therefore comparatively stable. Moreover, the two engine r. p. m. values $N_{NEW}$ and $N_{OLD}$ to be compared are detected under the same condition, so that the correlation between the differentiated r. p. m. $\Delta Ni$ and the combustion state of the pertinent cylinder #i at the combustion stroke is clarified. Accordingly, the combustion state can be conjectured at high precision.

Thereafter, at an S208, engine load data (=fundamental fuel injection pulse width) Tp is calculated on the basis of the engine r. p. m. $N_{NEW}$ and an intake air quantity Q evaluated in the routine at the present time ($Tp \leftarrow K \times Q/N_{NEW}$, K: constant).

Then, at an S209, a misfire judgement level $\Delta N_{LEVEL}$ is set in the light of a misfire judgement level map $MP\Delta N_{LEVEL}$, using the engine load data Tp and the engine r. p. m. $N_{NEW}$ as parameters.

Figure 6:
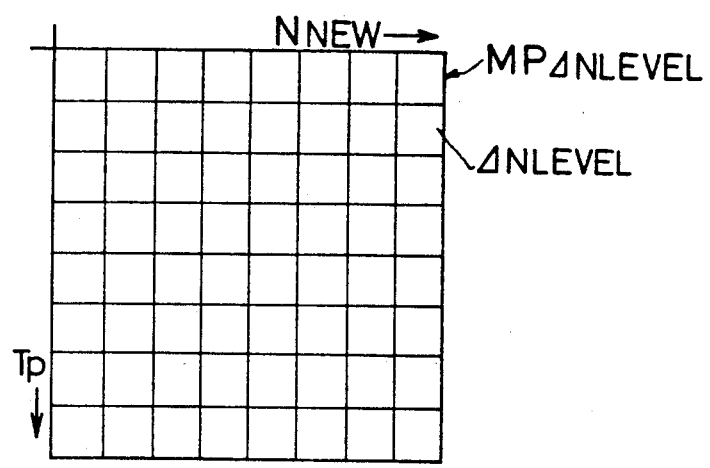
FIG. 6 is a conceptual diagram of a misfire judgement level map.

As shown in FIG. 6, the misfire judgement level map $MP\Delta N_{LEVEL}$ is a three-dimensional map whose parameters are the engine r. p. m. $N_{NEW}$ and the engine load data Tp, and in which the misfire judgement level $\Delta N_{LEVEL}$ evaluated by, e.g., an experiment beforehand is stored in each mesh region.

Figure 7:
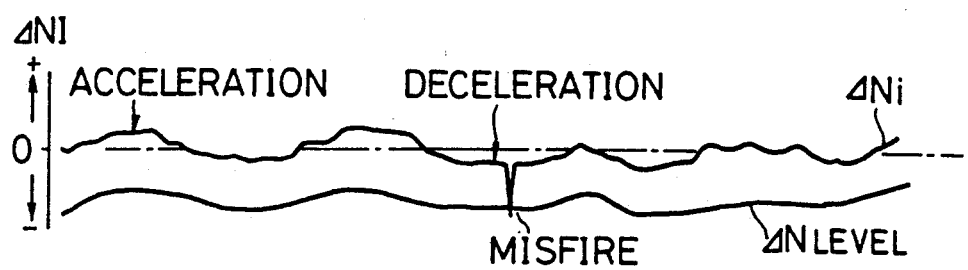
FIG. 7 is a time chart of differentiated r. p. m. and a misfire judgement level.

As shown in FIG. 7, the differentiated r. p. m. $\Delta Ni$ exhibit a comparatively large value in a transient state, but the fluctuating width thereof differs depending upon the operating conditions of the engine. Therefore, the fluctuating widths of the individual operating conditions are evaluated by, e.g., an experiment beforehand, and the misfire judgement levels $\Delta N_{LEVEL}$ conforming to the fluctuating widths are set and mapped, whereby a high accuracy for the misfire judgement can be attained.

Subsequently, an S210 compares the differentiated r. p. m. $\Delta Ni$ and the misfire judgement level $\Delta N_{LEVEL}$. In a case where $\Delta Ni < \Delta N_{LEVEL}$ holds, that is, where the differentiated r. p. m. $\Delta Ni$ of the pertinent cylinder #i at the combustion stroke is judged to be lower than the misfire judgement level $\Delta N_{LEVEL}$ (refer to FIG. 7), a misfire is decided, and the control flow proceeds to an S211. On the other hand, in case of $\Delta Ni \geq \Delta N_{LEVEL}$, normal combustion is decided, and the control flow proceeds to an S212.

At the S211, the misfire number $Ci2$ of each cylinder as corresponds to the pertinent cylinder #i at the combustion stroke is counted up ($Ci2 \leftarrow Ci2+1$), whereupon the control flow proceeds to the S212.

Then, the S212 makes the comparison between the calculative cycle number $Ci1$ of the pertinent cylinder #i at the combustion stroke and a preset sampling cycle number $Ci1_{SET}$ (for example, 100 cycles). In a case ($Ci1 < Ci1_{SET}$) where the calculative cycle number $Ci1$ does not reach the sampling cycle number $Ci1_{SET}$, the control flow jumps to an S220. On the other hand, in a case ($Ci1 \geq Ci1_{SET}$) where the calculative cycle number $Ci1$ reaches the sampling cycle number $Ci1_{SET}$, the control flow proceeds to an S213, at which the calculative cycle number $Ci1$ is reset ($Ci1 \leftarrow 0$).

Subsequently, at an S214, the average misfire number $\overline{Ci2(-1)}$ of each cylinder corresponding to the pertinent cylinder #1 at the combustion stroke, the number having been calculated in the last sampling period, is read out, and at an S215, the average misfire number $\overline{Ci2}$ of each cylinder at the present time is evaluated from the weighted average of weight coefficients r on the basis of the average misfire number $\overline{Ci2(-1)}$ of each cylinder and the misfire number $Ci2$ of each cylinder counted in the sampling cycle number $Ci1_{SET}$ at the present time ($\overline{Ci2} \leftarrow ((2^r-1) \times \overline{Ci2(-1)} + Ci2)/2^r$).

Since the average misfire number $\overline{Ci2}$ of each cylinder is evaluated in accordance with the weighted average, it is possible to correct the misfire judgement error of the pertinent cylinder #i at the combustion stroke and a temporary misfire misjudgement ascribable to an abrupt combustion fluctuation.

Thereafter, at an S216, the misfire number $Ci2$ of each cylinder is reset ($Ci2 \leftarrow 0$), and at an S217, the average misfire number $\overline{Ci2(-1)}$ of each cylinder calculated in the last sampling period is updated into the average misfire number $\overline{Ci2}$ of each cylinder calculated at the present time ($\overline{Ci2(-1)} \leftarrow \overline{Ci2}$).

Subsequently, an S218 makes the comparison between the average misfire number $\overline{Ci2}$ of each cylinder at the present time and a misfire abnormality deciding reference number $\overline{Ci2_{SET}}$ previously set. In a case where $\overline{Ci2} > \overline{Ci2_{SET}}$ holds, that is, where the average misfire number $\overline{Ci2}$ of each cylinder exceeds the misfire abnormality deciding reference number $\overline{Ci2_{SET}}$, it is judged that the pertinent cylinder #i undergoes a misfire abnormality, and the control flow proceeds to an S219. Here, the misfire abnormality data of the pertinent cylinder #i is stored in the predetermined address of the back-up RAM 25, and the driver is warned of the misfire abnormality by lighting up the warning means such as indicator lamp 29. Thereafter, the S219 is followed by the S220. In a case where $\overline{Ci2} \leq \overline{Ci2_{SET}}$ is decided, it is judged that the pertinent cylinder #i does not undergo a misfire abnormality yet, and the S218 is followed by the S220.

At the S220, the engine r. p. m. value $N_{OLD}$ calculated in the last routine is updated into the engine r. p. m. $N_{NEW}$ calculated at the present time ($N_{OLD} \leftarrow N_{NEW}$), and the routine is left.

Incidentally, the misfire abnormality data of the pertinent cylinder #i stored in the memory means (back-up RAM) 25 can be read out by connecting the serial monitor 31 in, e.g., the service station of a car dealer. Also, the misfire abnormality data stored in the memory means 25 can be cleared through the serial monitor 31.

Figure 10:
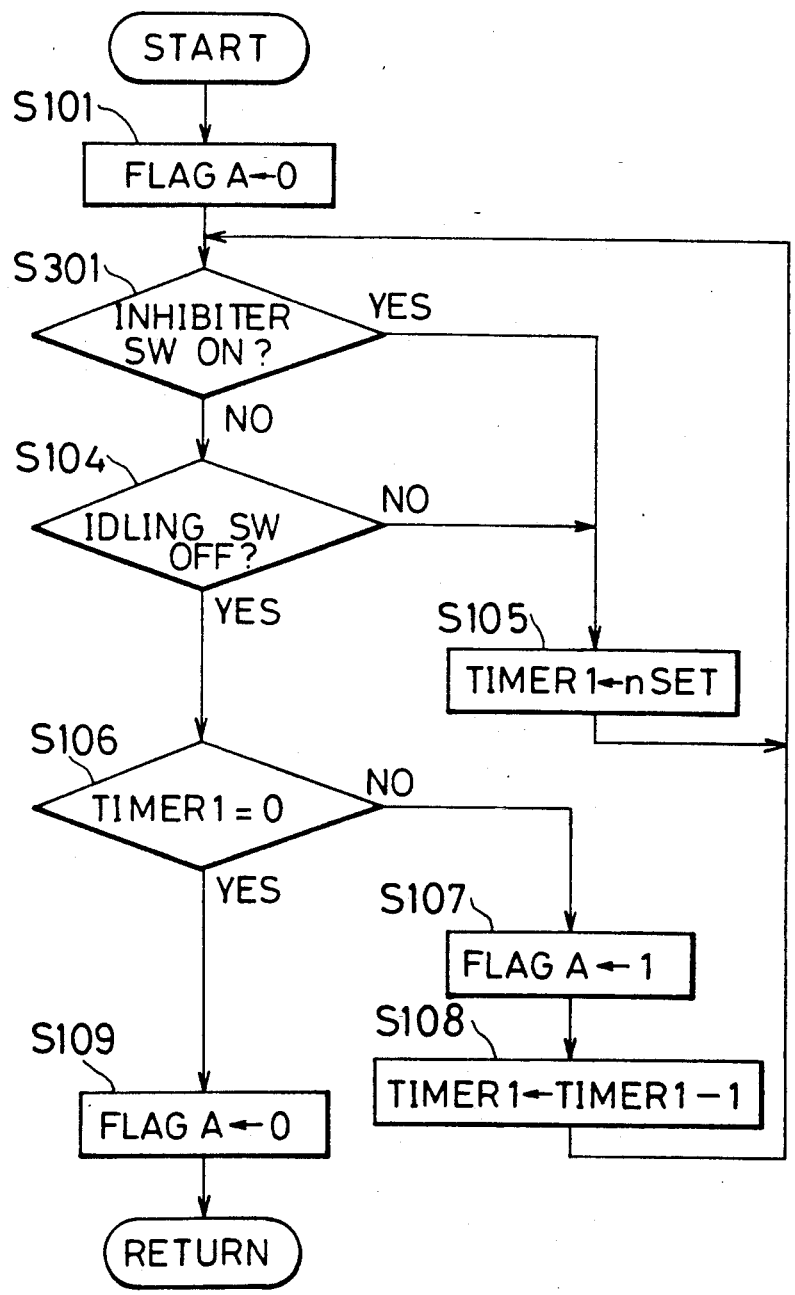
FIG. 10 is a flow chart showing misfire diagnosis stopping steps according to the second embodiment of the present invention.

FIG. 10 is a flow chart showing a misfire judging procedure according to the second embodiment of the present invention.

This embodiment consists in the misfire diagnosis stopping procedure in an automatic transmission car. The run state discriminating means 19 (refer to FIG. 2) in the first embodiment is replaced with an inhibiter switch which is turned ON when a select lever is set at a neutral (N) position or a parking (P) position.

In the misfire diagnosis stopping procedure, the ON/OFF state of the inhibiter switch is decided (an S301) instead of the S102 and S103 in the first embodiment, and the other steps are the same as in the first embodiment.

In a case where the inhibiter switch is decided ON at the S301, the select lever may possibly be thereafter set at a D range, a 1 range or the like, and hence, the control flow proceeds to the S105 at which the delay timer TIMER1 is set at the set value nSET.

On the other hand, in a case where the inhibiter switch is OFF, both the starting acceleration and the usual running are considered, and hence, if the idling switch 8 is ON (throttle fully closed) is judged at the S104.

The subsequent flow is the same as in FIG. 8.

By the way, in this embodiment, the accelerating state is judged by the inhibiter switch and the idling switch. Therefore, the gear shift acceleration (kickdown) cannot be judged, and only the starting acceleration is judged.

Figure 11A:
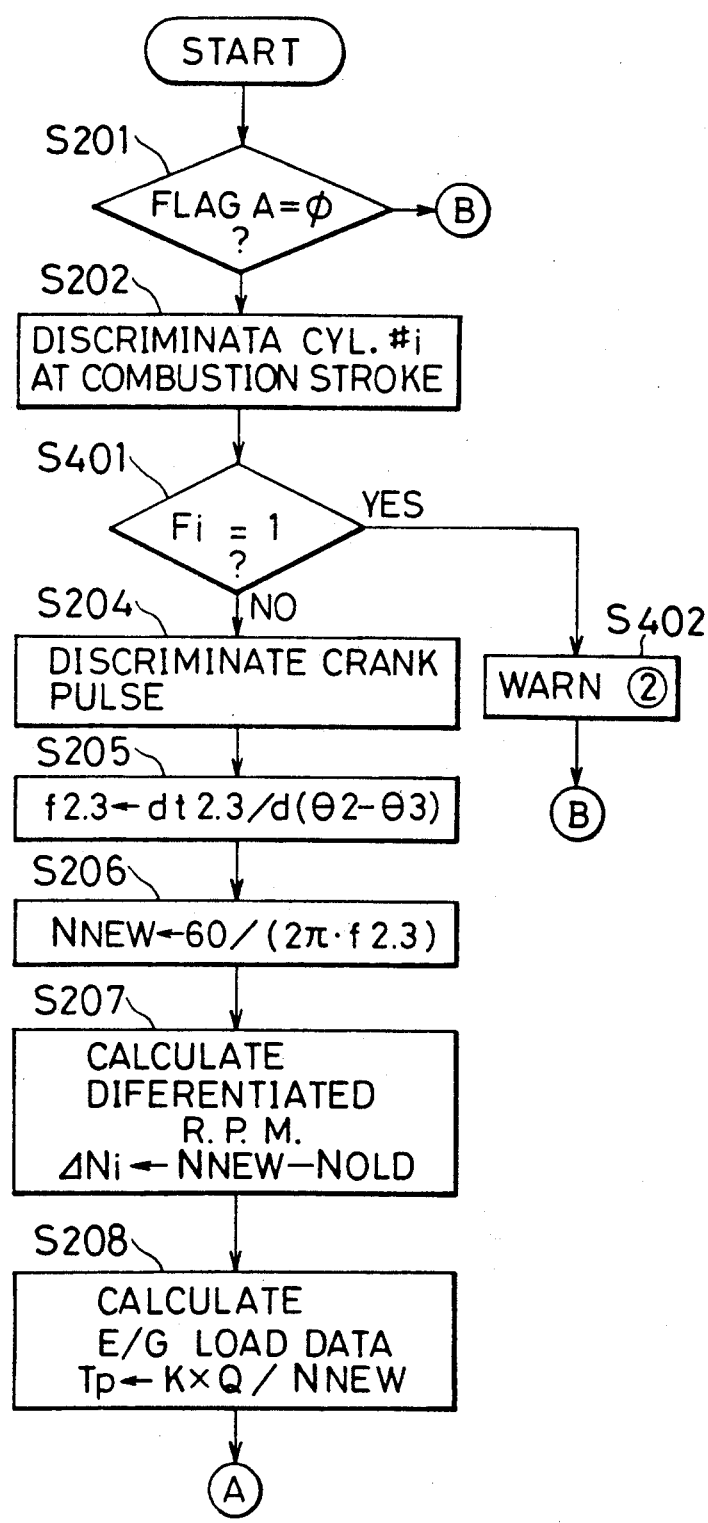
FIGS. 11a and 11b is a flow chart showing misfire judgement steps according to the third embodiment of the present invention.
Figure 11B:
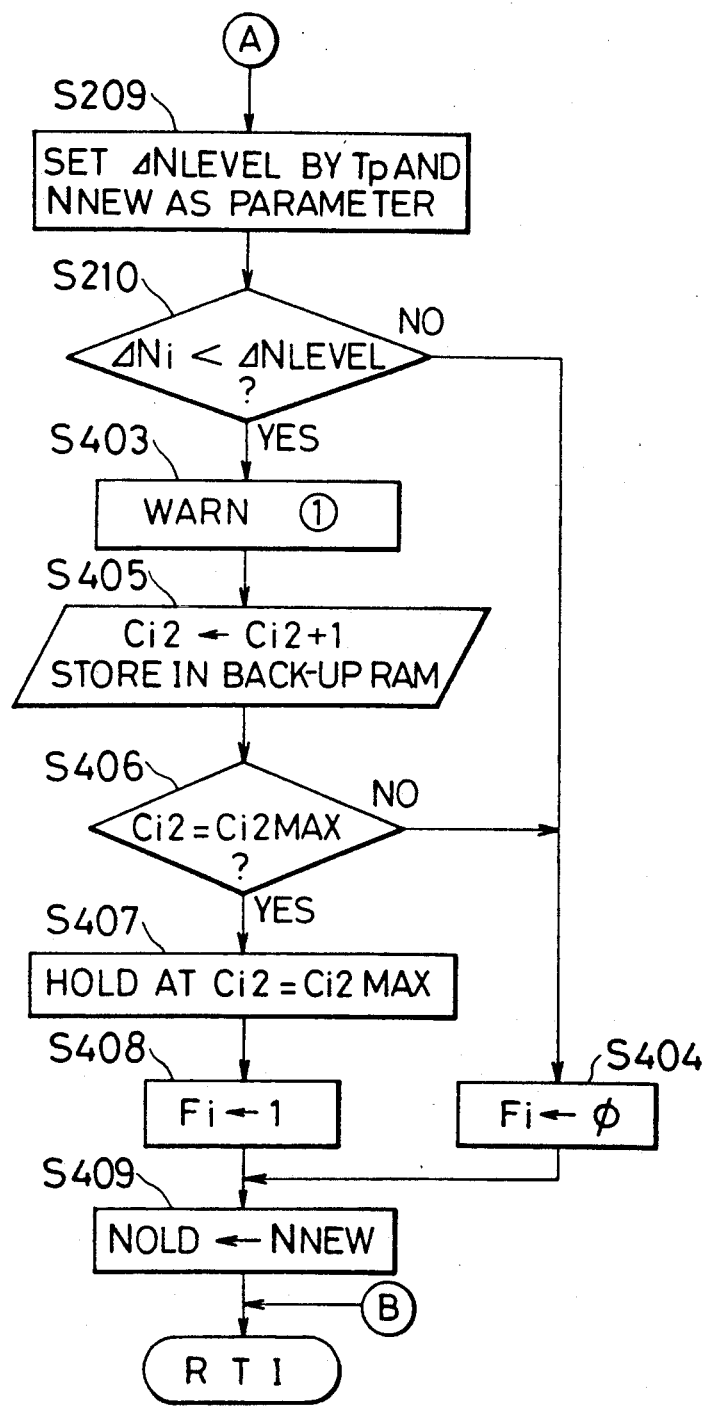

FIG. 11 is a flow chart showing a misfire judging procedure according to the third embodiment of the present invention.

Here, steps having functions similar to those of the first embodiment are denoted by the same symbols as in the first embodiment and shall be omitted from description.

In this embodiment, the number of misfires is sequentially stored for each cylinder. Moreover, in a case where the misfire number has reached the maximum count number, the maximum misfire number is fixed and stored.

An S201 judges if a misfire diagnosis stop is reset ($FLAG_A = 0$), and it is followed by an S202, at which cylinder #i at a combustion stroke is discriminated. Thereafter, an S401 discriminates whether the maximum misfire count number flag $Fi$ of the pertinent cylinder #i at the combustion stroke is in a set status ($Fi = 1$) or a reset status ($Fi = 0$). Here, in case of the set status ($Fi = 1$), the control flow proceeds to an S402, at which the warning means such as indicator lamp 29 is brought into a lit-up state to warn the driver of a misfire abnormality. Then, the routine is left. On the other hand, when the maximum misfire count number flag $Fi$ is judged to be in the reset status ($Fi = 0$), the same steps S204–S210 as in the first embodiment described before are executed.

Then, when the S210 decides that the pertinent cylinder #i at the combustion stroke undergoes a misfire ($\Delta Ni < \Delta N_{LEVEL}$), it is followed by an S403, and when it decides normal combustion ($\Delta Ni \geq \Delta N_{LEVEL}$), it is followed by an S304, at which the maximum misfire count number flag Fi is reset (Fi←0).

At the S403, the warning means such as indicator lamp 29 is lit up for a very short time, thereby to warn the driver of the occurrence of the misfire.

The driver recognizes the lighting frequence of the warning means 29, and can thus grasp the misfiring situation of the engine, namely, the operating conditions of the engine under which the misfires are liable to occur.

Subsequently, at an S405, the misfire number Ci2 of the pertinent cylinder #i is counted up (Ci2←Ci2+1), whereupon the value Ci2 counted up is stored in the predetermined address of the memory means (back up RAM) 25.

In, e.g., the service station of the car dealer, the serial monitor 31 is connected to read out the misfire number data of each cylinder stored in the memory means 25, and the misfiring situation is judged by, e.g., reference to a manual.

Thereafter, an S406 makes the comparison between the misfire number Ci2 of the pertinent cylinder #i and the maximum count number $Ci2_{MAX}$ previously set (for example, FFH corresponding to 2 bytes). In case of $Ci2 = Ci2_{MAX}$, the control flow proceeds to an S407, and in case of $Ci2 < Ci2_{MAX}$, the control flow proceeds to the S404.

When the control flow proceeds to the S407 upon judging that the misfire number Ci2 reaches the maximum count number $Ci2_{MAX}$ ($Ci2 = Ci2_{MAX}$), this misfire number Ci2 stored in the predetermined address of the memory means 25 is held at the maximum count number $Ci2_{MAX}$. At an S408, the maximum misfire count number flag Fi is set (Fi←1).

At an S409 following the S408 or the S404, the engine r. p. m. value $N_{OLD}$ calculated at the last time is updated into the engine r. p. m. $N_{NEW}$ calculated at the present time ($N_{OLD} \leftarrow N_{NEW}$). Then, the routine is left.

Incidentally, the present invention is not restricted to the foregoing embodiments. By way of example, even in the automatic transmission car, whether or not the misfire diagnosis is to be stopped may well be judged by detecting the gear shift acceleration (kick-down) from, e.g., the changing rate of a throttle opening per unit time.

In addition, although the engine r. p. m. value is employed as a momentum in each embodiment, it may well be replaced with a period, an angular velocity or an angular acceleration.

As described above, according to the present invention, there are comprised initial acceleration judging means for judging an initial acceleration on the basis of a detected result of acceleration detecting means; delay means for stopping a misfire judgement for a predetermined time period in a case where the initial acceleration has been judged; and misfire judging means for starting the misfire judgement of each cylinder after lapse of the predetermined delay time period. Therefore, the invention achieves such excellent effects that the erroneous diagnoses of misfires in the initial acceleration regions in which the misfires are liable to occur due to abrupt increases in the quantity of intake air are avoided, that the accuracy of diagnoses is enhanced and that a high reliability can be attained.

What is claimed is:

1. A misfire diagnosis apparatus for an internal combustion engine with a crankshaft for outputting power and a camshaft for actuating valves having, a crank plate connected to said crankshaft for indicating an crank angle, a crank angle sensor for detecting said crank angle of said crankshaft and for generating a crank angle signal, a cam plate connected to said camshaft for indicating a cam position, a cam angle sensor for detecting said cam position of said camshaft and for producing a cam angle signal, a clutch switch for detecting a clutch position and for producing a clutch signal, and a neutral switch for detecting a neutral position of a transmission and for generating a neutral position signal, said apparatus comprising:

initial acceleration judging means responsive to said clutch and neutral position signals for judging the beginning of an acceleration of said engine and for producing an acceleration signal;

discriminating means responsive to said crank angle signal and said cam angle signal for discriminating a cylinder number at a combustion stroke and for producing a cylinder number signal;

misfire judgement means responsive to said cylinder number signal, said crank angle signal and said cam angle signal for calculating a differentiated engine speed and for deciding a misfire of said cylinder number at said combustion stroke in order to generate a misfire signal;

warning means responsive to said misfire signal for storing a number of said misfire corresponding to said cylinder number and for indicating a malfunction of said internal combustion engine; and misfire judgement stopping means responsive to said acceleration signal for stopping a misfire judgement by said misfire judgement means for a predetermined period.

2. A misfiring diagnosis apparatus for an internal combustion engine operatively connected with a transmission, having engine speed detecting means for detecting a speed of said engine and misfire judgement means for judging an occurrence of a misfiring of the engine based on said engine speed, the apparatus comprising:

engine operating conditions detecting means for detecting operating conditions of said engine and for producing various signals representing said engine operating conditions;

acceleration detecting means responsive to said signals from said engine operating condition detecting means for detecting that said transmission is shifted and said engine is accelerated after the shift change of said transmission; and timer means for counting an elapsed time for a predetermined time when said accelerated detecting means detects acceleration after the shift change; wherein said misfire judgement means stops judging the misfire for said predetermining time counted by said timer means to thereby attain high reliability.

3. The apparatus according to claim 2, for use with a manual transmission.

4. The apparatus according to claim 3, wherein said engine operating condition detecting means comprises a neutral switch being turned off when said transmission is shifted out from a neutral position thereof, a clutch switch being flipped over between engaging and disengaging states of said clutch and an idle switch being turned off when said engine is operated beyond an idling state of thereof.

5. The apparatus according to claim 4, wherein said acceleration detecting means is adapted to detect the beginning of the acceleration after shift change of said transmission when said neutral switch is turned off, said clutch switch is flipped over from said disengaging state to said engaging state and said idling switch is turned off.

6. The apparatus according to claim 2, for use with an automatic transmission.

7. The apparatus according to claim 2, further comprising:
   warning means for warning a driver of a misfire abnormality when said misfire judging means judges the occurrence of the misfiring.

8. A misfiring diagnosis apparatus for an internal combustion engine with a crankshaft for outputting power of said engine and a camshaft for actuating valves of said engine, said apparatus having a crank angle detecting means for detecting a crank angle and for producing a crank angle signal, a cam angle detecting means for detecting a cam angle and for producing a cam angle signal, a neutral switch, a clutch switch, an idle switch, control means responsive to the crank angle signal and the cam angle signal for controlling and ignition timing of the engine, and misfiring judgement means responsive to the crank angle signal and the cam angle signal for judging an occurrence of a misfiring of the engine, the apparatus comprising:

shift position detecting means responsive to the neutral switch for detecting a shift position of a transmission operatively connecting the crankshaft through a clutch, and for producing a shift position signal except at a neutral position;

clutch detecting means responsive to the clutch switch for detecting an engaging condition of said clutch and for producing a clutch signal;

engine operating condition detecting means responsive to the idle switch for detecting a throttle valve opening condition except an idling position, and for producing a throttle signal;

initial acceleration detecting means responsive to said shift position signal, said clutch signal and said throttle signal for detecting a vehicle condition representing a starting of an accelerating operation after shift change, and for producing an acceleration signal;

timer means responsive to said acceleration signal for counting an elapsing time for a predetermined time and for producing a timer signal during said elapsing time; and means responsive to said timer signal for stopping an operation of said misfire judgement means so as to be able to attain high reliability.

9. The apparatus according to claim 8, further comprising:
   timer resetting means responsive to said clutch signal and said throttle signal for resetting the elapsing time when at least one of said clutch signal and said throttle signal is absent.

* * * * *